US012657646B2

(12) United States Patent
Kim

(10) Patent No.: US 12,657,646 B2
(45) Date of Patent: Jun. 16, 2026

(54) IMAGE PROCESSING APPARATUS AND IMAGE PROCESSING METHOD

(71) Applicant: LG INNOTEK CO., LTD., Seoul (KR)

(72) Inventor: Dae Hun Kim, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 613 days.

(21) Appl. No.: 17/919,374

(22) PCT Filed: Apr. 19, 2021

(86) PCT No.: PCT/KR2021/004896
§ 371 (c)(1),
(2) Date: Oct. 17, 2022

(87) PCT Pub. No.: WO2021/210968
PCT Pub. Date: Oct. 21, 2021

(65) Prior Publication Data
US 2023/0162316 A1 May 25, 2023

(30) Foreign Application Priority Data
Apr. 17, 2020 (KR) ........................ 10-2020-0047034

(51) Int. Cl.
*G06T 1/20* (2006.01)
*G06T 3/4053* (2024.01)
*G06T 5/50* (2006.01)

(52) U.S. Cl.
CPC .............. *G06T 1/20* (2013.01); *G06T 3/4053* (2013.01); *G06T 5/50* (2013.01); *G06T 2200/28* (2013.01); *G06T 2207/20084* (2013.01)

(58) Field of Classification Search
CPC ........... G06T 1/20; G06T 3/4053; G06T 5/50; G06T 2200/28; G06T 2207/20084;
(Continued)

(56) References Cited

U.S. PATENT DOCUMENTS 9,681,109 B2 * 6/2017 Siddiqui .............. H04N 23/741
10,186,052 B1 * 1/2019 Danilo ..................... G09G 5/02
(Continued)

FOREIGN PATENT DOCUMENTS

CN 114630007 A * 6/2022 ......... H04N 21/4307
KR 10-2011-0040468 A 4/2011
(Continued)

OTHER PUBLICATIONS

Yujie; Huang et al. "LineDL: Processing Images Line-by-Line With Deep Learning", May 2023, IEEE (Year: 2023).*

*Primary Examiner* — Aaron W Carter
*Assistant Examiner* — Alejandro Hernandez
(74) *Attorney, Agent, or Firm* — Birch, Stewart, Kolasch & Birch, LLP

(57) ABSTRACT

An image processing apparatus, according to one embodiment of the present invention, comprises: a receiver for receiving a first image and a second image; a first processor for outputting a third image by using at least one of the first image and the second image; a signal line bypassing at least one of the first image and the second image; a switch for connecting a signal output from the receiver to the first processor or the signal line; and a transmitter for transmitting at least two of the first to third images.

18 Claims, 8 Drawing Sheets

(58) Field of Classification Search

CPC ....... G06T 3/4076; G06T 5/60; G06T 7/0002; G06T 3/40; G06T 3/4015; G06T 3/4046; G06T 5/70; G06T 3/4092; G06T 2207/20081; G06T 2207/10048; G06T 5/73; H04N 23/951; H04N 25/42; H04N 23/815; H04N 23/45; H04N 23/80; H04N 25/00; H04N 23/10; H04N 23/60; G06N 20/00; G06N 3/02; G06N 3/08; G06N 3/04; G06V 10/82

See application file for complete search history.

(56) References Cited

U.S. PATENT DOCUMENTS

| | | | | |
|---|---|---|---|---|
| 10,602,119 | B1 * | 3/2020 | Bakhtazad | H04N 13/167 |
| 10,834,333 | B1 * | 11/2020 | Luski | G09G 5/395 |
| 10,859,805 | B2 * | 12/2020 | Themelis | G02B 21/36 |
| 11,146,762 | B2 * | 10/2021 | Shukla | H04N 23/84 |
| 11,295,477 | B1 * | 4/2022 | Wang | G06T 7/80 |
| 11,704,771 | B2 * | 7/2023 | Zhang | G06T 3/4046 |
| | | | | 345/660 |
| 2006/0045377 | A1 * | 3/2006 | Kawai | G06T 5/92 |
| | | | | 382/274 |
| 2006/0132657 | A1 * | 6/2006 | Lee | H04N 21/485 |
| | | | | 348/625 |
| 2010/0265533 | A1 * | 10/2010 | Liou | H04N 1/00278 |
| | | | | 358/1.15 |
| 2011/0058053 | A1 * | 3/2011 | Roh | H04N 23/45 |
| | | | | 348/222.1 |
| 2011/0085015 | A1 | 4/2011 | Jun et al. | |
| 2016/0195897 | A1 * | 7/2016 | Robinson | G06F 13/4081 |
| | | | | 710/304 |
| 2016/0253144 | A1 * | 9/2016 | Huang | G06F 3/038 |
| | | | | 345/2.2 |
| 2017/0263206 | A1 * | 9/2017 | Bae | G09G 5/395 |
| 2019/0104920 | A1 * | 4/2019 | Hashimoto | A61B 1/0002 |
| 2019/0238751 | A1 * | 8/2019 | Heo | H04N 25/683 |
| 2020/0112883 | A1 * | 4/2020 | Naik | H04L 47/125 |
| 2020/0193566 | A1 * | 6/2020 | Croxford | G02B 27/0172 |
| 2020/0218961 | A1 | 7/2020 | Kanazawa et al. | |
| 2020/0380674 | A1 * | 12/2020 | Ding | G06T 7/0012 |
| 2021/0117741 | A1 * | 4/2021 | Eguchi | G06F 3/1248 |
| 2022/0019777 | A1 * | 1/2022 | Jang | G06N 3/04 |
| 2022/0199051 | A1 * | 6/2022 | Komiyama | G06F 3/14 |
| 2022/0309712 | A1 * | 9/2022 | Lee | G06T 5/70 |
| 2022/0408039 | A1 * | 12/2022 | Park | H04N 25/778 |
| 2023/0017271 | A1 * | 1/2023 | Kim | G06T 7/13 |
| 2023/0017778 | A1 * | 1/2023 | Sinha | G06N 3/0442 |
| 2023/0136873 | A1 * | 5/2023 | Wang | G06F 3/04897 |
| | | | | 345/1.1 |
| 2023/0145321 | A1 * | 5/2023 | Lee | H04N 23/843 |
| | | | | 348/254 |
| 2024/0037810 | A1 * | 2/2024 | Gong | G06T 7/0002 |
| 2024/0153451 | A1 * | 5/2024 | Choi | G06N 20/00 |
| 2024/0179423 | A1 * | 5/2024 | Kim | G06T 5/50 |
| 2025/0008047 | A1 * | 1/2025 | Ishigami | G06T 3/40 |

FOREIGN PATENT DOCUMENTS

| | | | | |
|---|---|---|---|---|
| KR | 10-2017-0105213 | A | 9/2017 | |
| KR | 10-2020-0004427 | A | 1/2020 | |
| KR | 10-2064746 | B1 | 1/2020 | |
| KR | 10-2020-0033346 | A | 3/2020 | |
| KR | 20220020457 | A * | 2/2022 | ............. H04N 23/65 |

* cited by examiner

IMAGE PROCESSING APPARATUS AND IMAGE PROCESSING METHOD

CROSS REFERENCE TO RELATED APPLICATIONS

This application is the National Phase of PCT International Application No. PCT/KR2021/004896, filed on Apr. 19, 2021, which claims priority under 35 U.S.C. § 119 (a) to Patent Application No. 10-2020-0047034, filed in the Republic of Korea on Apr. 17, 2020, all of which are hereby expressly incorporated by reference into the present application.

TECHNICAL FIELD

The present invention relates to an image processing apparatus, and more particularly, to an image processing apparatus and an image processing method for receiving a plurality of images and performing image processing or bypassing the transmission.

BACKGROUND ART

The camera, which is an essential module of smartphones, increasingly requires high resolution sensors and uses expensive APs in order to add various functions, and deep learning based technologies are being adapted into such APs. However, no matter how high-end APs are, it is difficult to apply preprocessing based deep learning technologies that process a lot of data, so attempts are being made to reduce the resource load of APs using additional chips.

With the development of deep learning based image processing technology, deep learning networks are also being introduced in various ways in smartphones. They are working hard to develop expensive APs capable of processing deep learning, and each AP developer is releasing products suitable for neural networks.

Company G develops a tensor processing unit (TPU); Company I develops ASIC-type processors such as EyeQ and Loih; Company A independently constructed circuits optimized for artificial intelligence operations, such as A11 Bionic and A12 Bionic; and Company Q, a representative mobile AP, has also developed and released chips embedded with neural processing unit (NPU) and neural processing engine (NPE) such as Snapdragon 845 and 855.

However, these processors are not specialized for specific functions, but rather to respond to general artificial intelligence services and since they are not optimized for a specific product like a camera but very expensive APs, they are applicable only to premium-grade models among smartphones.

In order to apply it to models other than the premium class, it is necessary to use a low-cost AP, and since SW processing should be simplified accordingly, no matter how good a camera is, it is difficult to receive this high-end camera data from the AP and process it in various ways.

In order to overcome this limitation of the AP, if the camera module stage processes and delivers the camera pre-processing functions that the AP has to do in advance, the power consumption of the AP can be reduced and the SW resource may also be available.

In addition, the recent adoption of smartphone camera modules is a concept of Dual/Triple-Penta, and its utilization is increasing through fusion of multiple camera input images for functional expansion.

Recently, as two or more cameras have been used as mainstream for smartphones, interface ready at the AP stage for multi-camera use has become an issue, and there is a method using a separate MIPI Switch IC and the like in order to respond to the adoption of multi-camera use in mid-to-low-cost APs. This is a method to solve the problem that low-cost APs installed in mid-to-low-end phones do not have multiple MIPI channels. However, since it has a structure that cannot transmit two camera images to the AP at the same time, there are functional restrictions because methods for improving camera quality by fusion of multi-camera images could not be applied by providing only the switching function of the Mux structure, which is provided by selecting only one camera.

DETAILED DESCRIPTION OF THE INVENTION

Technical Subject

The technical problem to be solved by the present invention is to provide an image processing apparatus and an image processing method for receiving a plurality of images and performing image processing or bypassing the transmission.

Technical Solution

In order to solve the above technical problem, an image processing apparatus according to an embodiment of the present invention comprises: a receiver for receiving a first image and a second image; a first processor for outputting a third image by using at least one among the first image and the second image; a signal line bypassing at least one of the first image and the second image; a switch connecting the signal outputted from the receiver to the first processor or the signal line; and a transmitter for transmitting at least two among the first to third images.

In addition, the first process may include a convolutional neural network.

In addition, the switch may include: a first switch for connecting the first image to the signal line or the first processor according to a control signal; and a second switch for connecting the second image to the signal line or the first processor according to the control signal.

In addition, the switch may connect one of the first image and the second image to the first processor and connect the other one to the signal line.

In addition, the switch may connect the first image and the second image to the signal line.

In addition, the signal line includes a first signal line and a second signal line, the first image is connected to the first signal line by the switch, and the second image may be connected to the second signal line by the switch.

In addition, the first signal line includes a first synchronizing unit, and the second signal line may include a second synchronizing unit.

In addition, the transmitter may transmit the at least two images to a second processor.

In order to solve the above technical problem, an image processing method according to an embodiment of the present invention comprises the steps of: receiving a first image and a second image; connecting the first image and the second image to a first processor or signal line; and sending at least two images among a third image being outputted from the first processor, the first image bypassed through the signal line, or the second image, wherein the first processor outputs a third image by using at least one of the first image and the second image, and wherein the signal line bypasses at least one of the first image and the second image.

In addition, the first process may include a convolutional neural network.

In addition, the step of connecting the first image and the second image to the first processor or signal line connects the first image to the signal line or the first processor using a first switch according to a control signal, and may connect the second image to the signal line or the first processor using a second switch according to the control signal.

In addition, the step of connecting the first image and the second image to a first processor or signal line connects one of the first image and the second image to the first processor, and connects the other one to the signal line, or may connect the first image and the second image to the signal line.

In addition, the signal line includes a first signal line and a second signal line, wherein the first image is connected to the first signal line when the first image or the second image is connected to the signal line, and wherein the second image may be connected to the second signal line.

In addition, the method may include a step of synchronizing a first image or a second image connected to the signal line with the third image.

In addition, the step of transmitting the at least two images may transmit the at least two images to a second processor.

Advantageous Effects

According to embodiments of the present invention, compatibility is provided so that a user can effectively use multi-frame image technology being inputted through a plurality of cameras in various scenario modes related to image photographing, and it is possible to apply the image quality improvement function according to de-noise technology and super resolution according to the corresponding scenarios.

In generating a high-resolution image, since digital zoom is performed by increasing the resolution of Bayer data, which is raw data rather than RGB images, it is possible to obtain a high-resolution image with a high quality due to the large amount of information when compared to the case of increasing the resolution for an RGB image.

In addition, it is possible to increase the resolution of the ToF IR image and combine it with the RGB image to enhance the effect of improving the low light RGB. It is not necessary to add an additional configuration, and it is possible to obtain an RGB image with excellent image quality in a low-light environment without significantly increasing the amount of computation.

Furthermore, it is possible to generate an RGB image with improved image quality while increasing the resolution of the RGB image.

BEST MODE

Hereinafter, preferred embodiments of the present invention will be described in detail with reference to the accompanying drawings.

However, the technical idea of the present invention is not limited to some embodiments to be described, but may be implemented in various forms, and within the scope of the technical idea of the present invention, one or more of the constituent elements may be selectively combined or substituted between embodiments.

In addition, the terms (including technical and scientific terms) used in the embodiments of the present invention, unless explicitly defined and described, can be interpreted as a meaning that can be generally understood by a person skilled in the art, and commonly used terms such as terms defined in the dictionary may be interpreted in consideration of the meaning of the context of the related technology.

In addition, terms used in the present specification are for describing embodiments and are not intended to limit the present invention.

In the present specification, the singular form may include the plural form unless specifically stated in the phrase, and when described as "at least one (or more than one) of A and B and C", it may include one or more of all combinations that can be combined with A, B, and C.

In addition, in describing the components of the embodiment of the present invention, terms such as first, second, A, B, (a), and (b) may be used. These terms are merely intended to distinguish the components from other components, and the terms do not limit the nature, order or sequence of the components.

And, when a component is described as being 'connected', 'coupled' or 'interconnected' to another component, the component is not only directly connected, coupled or interconnected to the other component, but may also include cases of being 'connected', 'coupled', or 'interconnected' due that another component between that other components.

In addition, when described as being formed or arranged in "on (above)" or "below (under)" of each component, "on (above)" or "below (under)" means that it includes not only the case where the two components are directly in contact with, but also the case where one or more other components are formed or arranged between the two components. In addition, when expressed as "on (above)" or "below (under)", the meaning of not only an upward direction but also a downward direction based on one component may be included.

Figure 1:
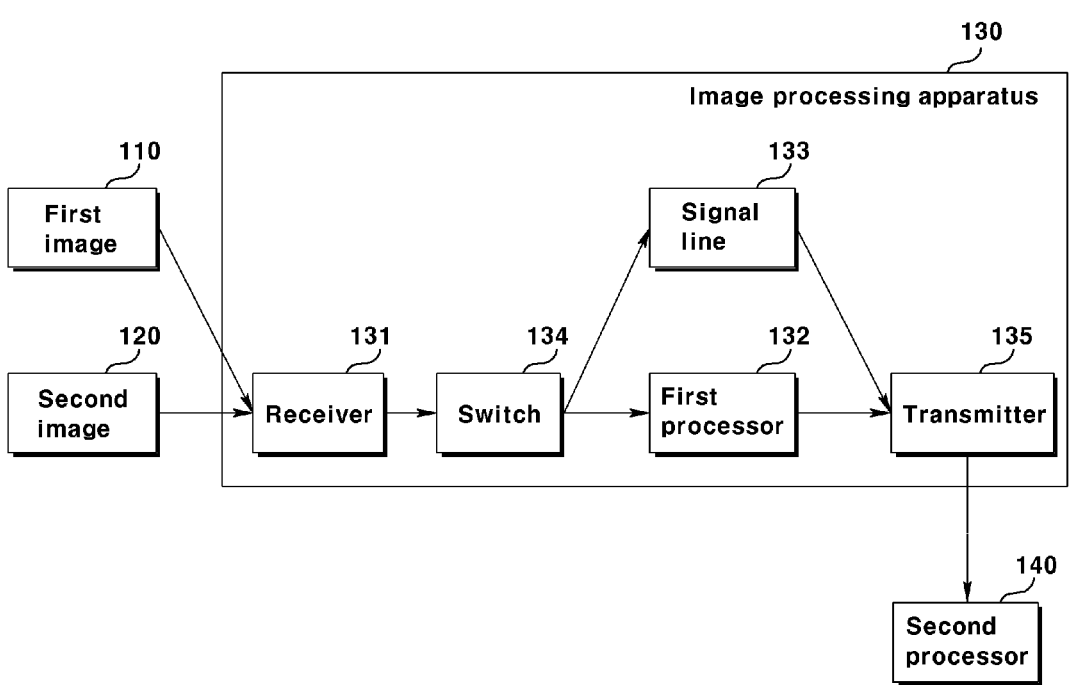
FIG. 1 is a block diagram of an image processing apparatus according to an embodiment of the present invention.

FIG. 1 is a block diagram of an image processing apparatus according to an embodiment of the present invention.

The image processing apparatus 130 according to an embodiment of the present invention comprises a receiver 131, a first processor 132, a signal line 133, a switch 134, and a transmitter 135, and it may further include a synchronizing unit or a memory.

The receiver 131 receives a first image 110 and a second image 120.

More specifically, the receiver 131 may receive a plurality of images being generated and outputted from each image sensor of the plurality of image sensors, respectively. For example, a first image and a second image are respectively received from two image sensors. Each image may be received from three or more image sensors. Here, a first image or a second image is raw data generated and outputted by the image sensor, and may be Bayer data or IR data. Bayer data contains more information than RGB image data being generated by performing image processing.

Each image sensor of the plurality of image sensors may be an image sensor that performs different functions. The image sensor may include an image sensor such as a complementary metal oxide semiconductor (CMOS) or a charge coupled device (CCD) that converts light entering through a lens of the camera module into an electrical signal. The image sensor may generate Bayer data including information on a Bayer pattern through a color filter for the acquired image. The Bayer data may have a first resolution according to a specification of an image sensor or a zoom magnification set when a corresponding image is generated. Or, it may be a time of flight (ToF) image sensor that generates IR data. An image generated by the plurality of image sensors may vary according to the lens being mounted. For example, when a telephoto lens is mounted, data to which zoom is applied may be generated. In addition, the receiver 131 may receive various images from various image sensors.

The first image 110 and the second image 120 may be images generated at the same time. Since the images are generated at the same time, the first image 110 and the second image 120 may be moved or processed in synchronization.

The first processor 132 outputs a third image using at least one of the first image 110 and the second image 120.

More specifically, when receiving at least one of the first image 110 and the second image 120 received by the receiver 131, the first processor 132 outputs a third image from the received image. Here, the third image may be an image having a higher resolution than that of the image being inputted. The first processor 132 may generate a first image having a first resolution or a third image having a second resolution from the second image by using the learned convolutional neural network. Here, the first resolution may be a resolution different from the second resolution, and the second resolution may be higher than the first resolution. The first resolution may be a resolution of data being outputted by the corresponding image sensor, and the second resolution may be changed according to a user's setting or may be a preset resolution.

The processor 132 may perform super resolution (SR) generating a third image having a second resolution from at least one image of the first image or the second image having a first resolution by using a learned convolutional neural network. Here, super resolution is a process of generating a high-resolution image based on a low-resolution image, and it functions as a digital zoom that generates a high resolution image from a low resolution image through image processing rather than a physical optical zoom. Super resolution is used to improve the quality of compressed or down-sampled images, or it can be used to enhance the quality of an image having a resolution according to device limitations. In addition, it may be used to increase the resolution of an image in various fields.

As in super resolution, in performing the process of increasing the resolution, the quality of the result in which the resolution has been improved can be enhanced by performing the process of increasing the resolution by using the first image or the second image that is a Bayer data, not an RGB image.

The processor 132 may increase the resolution of the inputted IR data which is generated in the ToF image sensor. In the second processor 140, which will be described later, a third image may be generated by using the IR image generated from a third image, which is IR data, so that the IR image and the first RGB image have the same size, that is, the resolution, in order to improve the quality of the first RGB image being generated from Bayer data being outputted from another image sensor.

Figure 9:
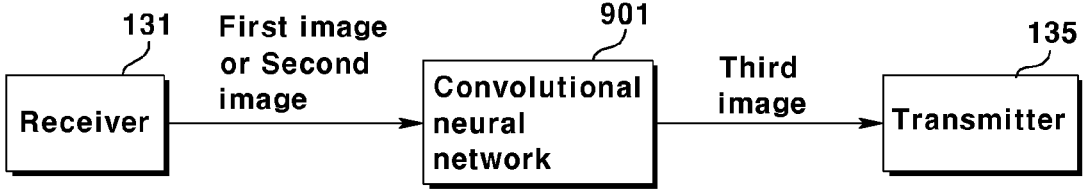
FIGS. 9 to 11 are diagrams for explaining an image processing process.

A process in which the processor 132 outputs a third image using the convolutional neural network will be described in detail later with reference to FIGS. 9 to 11.

The signal line 133 is a line bypassing at least one of the first image 110 and the second image 120.

More specifically, the signal line 133 bypasses a first image 110 or a second image 120 that is not inputted to the first processor 132. The signal line 133 is a signal line connecting the receiver 131 and the transmitter 135, and transfers the image received from the receiver 131 to the transmitter 135 without a separate processing process. The signal line 133 may let all of them bypass the first processor 132, when neither the first image 110 nor the second image 120 is inputted to the first processor 132, that is, without image processing through the first processor 132. Or, when both the first image 110 and the second image 120 are inputted to the first processor 132, each image may not be bypassed.

The switch 134 connects the signal being outputted from the receiver 131 to the first processor 132 or the signal line 133.

More specifically, the switch 134 connects a first image or a second image being outputted from the receiver 131 to the first processor 132 or signal line 133 respectively. When receiving a control signal to generate a third image through the first processor 132 among a first image or a second image, the corresponding image is connected to the first processor 132 and other images are connected to the signal line 133 so that the first processor 132 is bypassed. Here, the control signal may be a mode instruction letting the data of a specific camera pass through a preprocessor.

The switch 134 connects one of the first image and the second image to the first processor 132 and may connect the other one to the signal line 133. A first image or a second image for generating a third image is connected to the first processor 132 and the other image is connected to the signal line 133 according to a control signal generating a third image using one of a first image and a second image so that the first processor 132 can be bypassed.

In addition, a switch 134 may connect the first image and the second image to the signal line 133. When a control signal for a first image or a second image for generating a third image is not received, both the first image and the second image are connected to the signal line 133 so that the first processor 132 can be bypassed.

Figure 2:
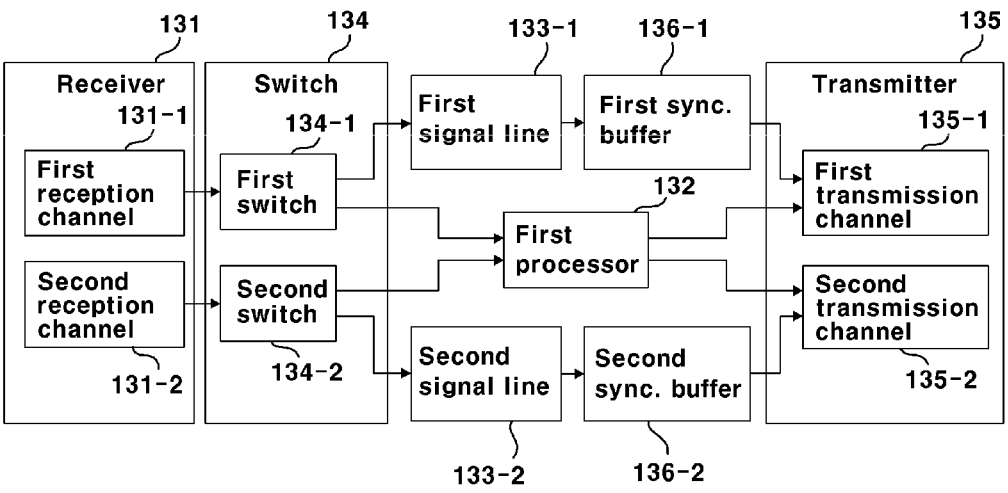
FIG. 2 is a block diagram of an image processing apparatus according to an embodiment of the present invention.

The switch 134 may include, as shown in FIG. 2, a first switch 134 connecting the first image to the signal line or the first processor according to a control signal, and a second switch 134 for connecting the second image to the signal line or the first processor according to the control signal. The receiver 131 may include: a first reception channel 131-1 for receiving and outputting a first image; and a second reception channel 131-2 for receiving and outputting a second image, wherein the first switch 134 and the second switch 134 connect signals being outputted from the first reception channel 131-1 and the second reception channel 131-2, respectively to the signal line 133 or first processor 132.

At this time, the signal line 133 may include a first signal line 133 and a second signal line 133 as shown in FIG. 2. The first signal line 133 is a path bypassing the first image, and the second signal line 133 may be a path for bypassing the second image. There are cases where both images are bypassed, and each of the signal lines may be formed, respectively.

The first image is connected to the first processor 132 or the first signal line 133 by the first switch 134, and the second image may be connected to the first processor 132 or the second signal line 133 by the second switch 134.

The switch 134 serves to connect the path through the signal line 133 or the first processor 132 of a first image or a second image, or connects the receiver 131 and the signal line 133 or the first processor 132, or may connect the signal line 133 or the first processor 132 and the transmitter 135. The switch 134 is implemented as a multiplexer or de-multiplexer or a general switch such as an FET may be used.

The transmitter 135 transmits at least two images among the first to third images.

More specifically, the transmitter 135 receives an image from the first processor 132 or the signal line 133. A third image is received from the first processor 132, and at least one of the first image and the second image is received from the signal line 133. That is, the first image and the third image, the second image and the third image, or the first image and the second image may be received, and the two images that have been received may be transmitted to the outside.

The transmitter 135 may transmit two images through the first transmission channel 135-1 and the second transmission channel 135-2, respectively. The first transmission channel 135-1 may transmit a first image or a third image, and the second transmission channel 135-2 may transmit a second image or a third image.

The transmitter 135 may transmit at least two of the first to third images to the second processor 140. The second processor 140 may generate an RGB image by performing additional image processing necessary to generate an RGB image on the two images that have been received.

When the transmitter 135 transmits at least two images among the first to third images, the two images may have to be transmitted simultaneously, and to this end, as shown in FIG. 2, each of the signal lines 133-1 and 133-2 may include synchronizing units 136-1 and 136-2.

The first signal line 133 includes a first synchronizing unit 136-1, and the second signal line 133 may include a second synchronizing unit 136-2.

As described previously, since a first image and a second image are images that have to be generated at the same time, they need to be transmitted or processed in synchronization. However, when following different paths of the first processor 132 or the signal line 133, there may be differences in transmission time, and due to this, transmission time may vary in the transmitter 135.

Therefore, in order to synchronize the transmission time at the transmitter 135, each signal line includes a synchronizing unit for synchronizing a third image being outputted through the first processor and an image bypassing the first processor 132 through each signal line.

For example, when a first image is connected to the first signal line 133 by the first switch 134 and a second image is connected to the first processor 132 by the second switch 134, it takes time to generate a third image from the second image in the first processor 132, and thus, the time at which the transmitter 135 transmits the first image and the third image may be different. To synchronize this, the first synchronizing unit 136-1 may synchronize the time, at which a first image is outputted to the transmitter 135, with the time, at which a third image is outputted from the first processor 132. The transmitter 135 may simultaneously transmit the first image and the third image that had been received simultaneously to the second processor 140. The second processor 140 may synchronize and process the first image and the third image that had been received after synchronization.

Figure 3:
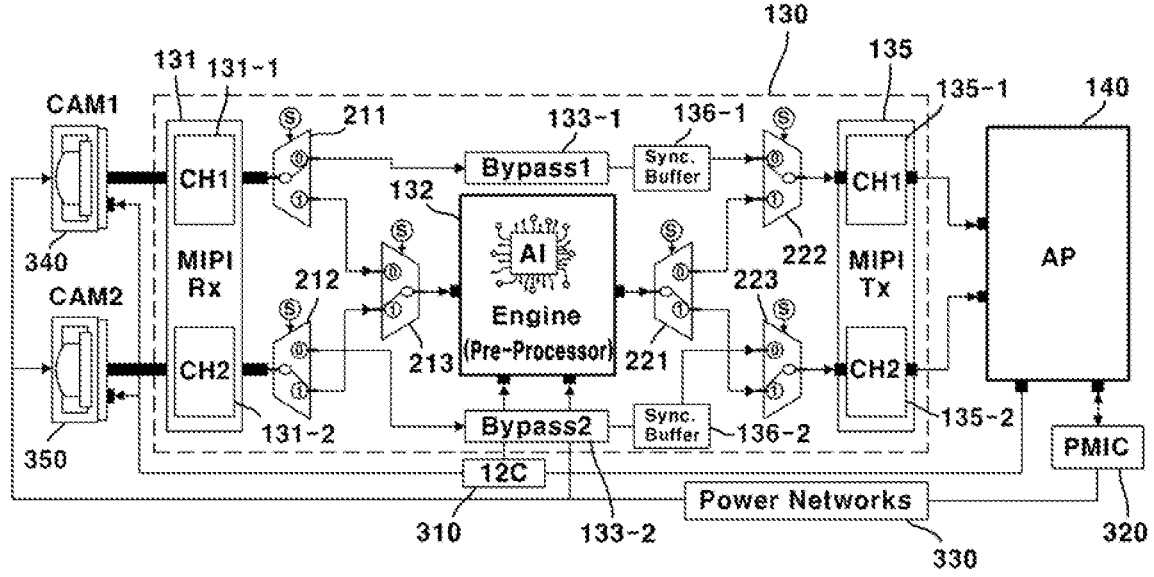
FIGS. 3 to 8 are diagrams for explaining an image processing path in an image processing apparatus.

FIG. 3 is an actual implement example of an image processing apparatus 130 according to an embodiment of the present invention, the image is processed for a first data being inputted from two image sensors being formed in the two cameras 340 and 350 using one processor 132, and outputted to the AP 140.

Each of the receiver 131 and the transmitter 135 may input/output data through the cameras 110 and 120 and the AP 140 and MIPI, respectively. Here, mobile industry processor interface (MIPI) refers to an interface to a processor and peripheral devices, including an AP, in order to enhance reuse and compatibility in mobile and IoT devices.

The AP 140 may control the resolution conversion operation by transmitting the resolution conversion control signal to the two cameras 340 and 350 and the first processor 132 through the 12C 310 interface.

When the user runs the camera application of the mobile terminal, the 12C 310 interface may automatically send the control signals of the camera modules 340 and 350 and the image processing apparatus (AI Chip) 132 and the initial setup values of each module or device and parameter data of the image processing apparatus (AI Chip) through the AP. In addition, the AP 140 controls the PMIC 320 so that the power transmission for the cameras 340 and 350 and the image processing apparatus 130 can be controlled through the power network 330. That is, the AP 140 can control the cameras 340 and 350 and the image processing apparatus 130. Therefore, the user can control the cameras 340 and 350 and image processing apparatus 130 by entering a command to the AP 140.

The switch on the receiver 131 side operating in a way that the first image or the second image inputted to the first reception channel 131-1 and the second reception channel 131-2 of the receiver 131 can be applied to the first processor 132 or the signal lines 133-1 and 133-2 may be implemented with a de-multiplexer and a multiplexer as shown in FIG. 3.

In the receiver 131, the path from the first processor 132 or signal line 133 may be set by the plurality of first de-multiplexers 211 and 212 and the first multiplexer 213. Here, the multiplexer and the de-multiplexer are configurations switching signal paths, and it may be a switch that does not have a signal separation or combination function. In addition, in a specific example, it may be a switch including a function of combining/separating signals of two paths.

The first de-multiplexers 211 and 212 operate in a way that the image being inputted to each of the receiving channels 231 and 232 is to be connected to the processor 132 or the signal line 133. A de-multiplexer is an inverse multiplexer which is a circuit that outputs multiple outputs from one input, and it is also called as a distributor. As shown in FIG. 3, one input may be outputted via one of two outputs. That is, it is operated so that the first image or the second image is connected to one of the two paths leading to the processor 132 and the signal line 133.

The first multiplexer 213 operates so that an image being outputted from the first de-multiplexer that operates such that the first image or the second image is connected to the first processor 132 of the plurality of first de-multiplexers 211 and 212 is connected to the first processor 132. Multiplexer is a circuit that selects one of multiple inputs to output, and as shown in FIG. 3, one can be outputted from two inputs. The input line applied to the first multiplexer 213 may vary depending on the number of the plurality of first de-multiplexers 211 and 212, and it is operated so that the image inputted is connected with the first processor 132 when the images are connected and inputted among multiple inputs.

Corresponding to setting the path of the receiver 131 and the first processor 132 or the signal line 133, a switch may be included for setting a path of the transmitter 135 and the first processor 132 or the signal line 133.

The switch on the transmitter 135 side operates so that the third image outputted from the first processor 132 is connected to the corresponding transmission channel, and operates so that the image bypassing the first processor 132 is connected to the corresponding transmission channel. The operation of the switch on the transmitter 135 side operates opposite to the operation of the switch on the receiver 131 side, and the switch on the transmitter 135 side may also operate according to the resolution conversion control signal.

The switch on the transmitter 135 side may include at least one second de-multiplexer 221 that operates in a way that the third image outputted from the first processor 132 is applied to one of the plurality of transmission channels 135-1 and 135-2, and may include second multiplexers 222 and 223 that operates in a way that a third image being outputted from the second de-multiplexer 221 or an image bypassing the first processor 132 is connected to the corresponding transmission channel among multiple transmission channels.

As such, the image processing apparatus 130 being implemented may form each bypass path and a resolution conversion path passing through the first processor 132 for the two cameras 340 and 350. For camera 1 (CAM1) 340: a bypass path via a first reception channel (CH1) 131-1->a first de-multiplexer 211->a first signal line (Bypass1) 133-1->a first synchronizing unit (sync. Buffer) 136-1->a second multiplexer 222-> and a first transmission channel 135-1; and a resolution conversion path via a first reception channel (CH1) 131-1->a first de-multiplexer 211->a first multiplexer 213->a first processor (AI engine, pre-processor) 132->a second de-multiplexer 221->a second multiplexer 222-> and a first transmission channel 135-1, are formed.

In addition, for camera 2 (CAM2) 350: a bypass path via a second reception channel (CH2) 131-2->a first de-multiplexer 212->a second signal line (Bypass2) 133-2->a second synchronizing unit (sync. Buffer) 136-2->a second multiplexer 223-> and a first transmission channel 135-2; and a resolution conversion path via a second reception channel (CH2) 131-2->a first de-multiplexer 212->a first multiplexer 213->a first processor 132->a second de-multiplexer 221->a second multiplexer 223-> and a first transmission channel 135-2, are formed.

A bypass path or a resolution conversion path may operate according to the mode selection according to the user's input. The selectable mode may include a bypass mode (AI-SR bypass mode), a resolution conversion mode (AI-SR Zoom mode), and a sleep mode, and various other settings may be possible.

Figure 4:
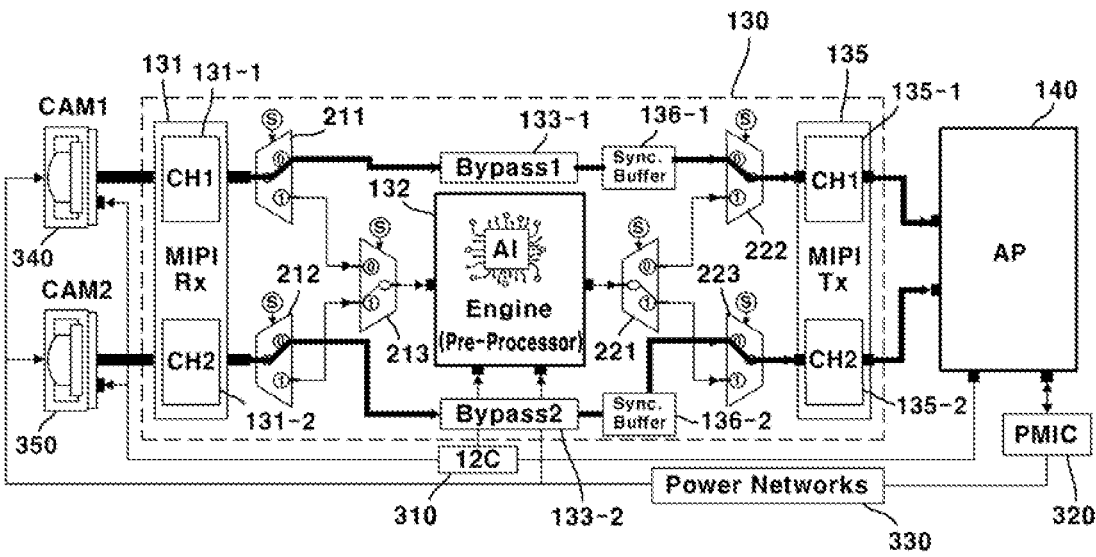

When the user starts the camera application, AP 140 will request "Streaming ON" to the cameras 340 and 350. Bypass mode (AI-SR Bypass mode) means that the output of each image sensor of the camera 1 340 and the camera 2 350 is transmitted to the AP 140 without change through the first processor 132. In this case, a path is formed as shown in FIG. 4. At this time, the control signals applied to the cameras CAM1 340, CAM2 350, the first de-multiplexer DMW1 211, DMW2 212, the first multiplexer MW1 213, the second de-multiplexer DMW3 221, the second multiplexer MW2 222, and MW3 223 are as follows.

TABLE 1

| CAM1 | CAM2 | DMW1 | DMW2 | MW1 | DMW3 | MW2 | MW3 |
|--------|--------|------|------|------|------|-----|-----|
| Bypass | Bypass | 0 | 0 | Nop. | Nop. | 0 | 0 |

Figure 5:
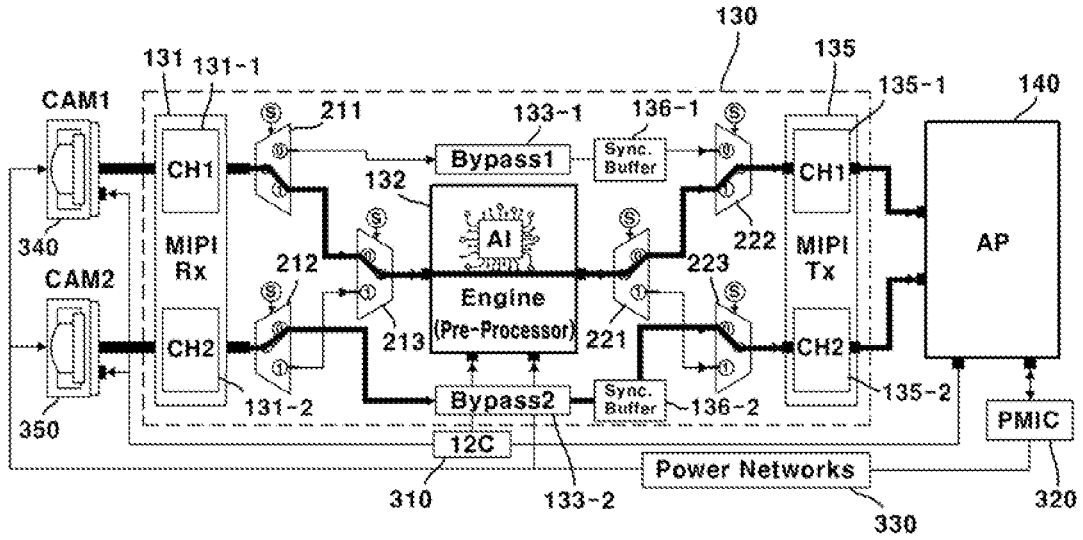
Figure 6:
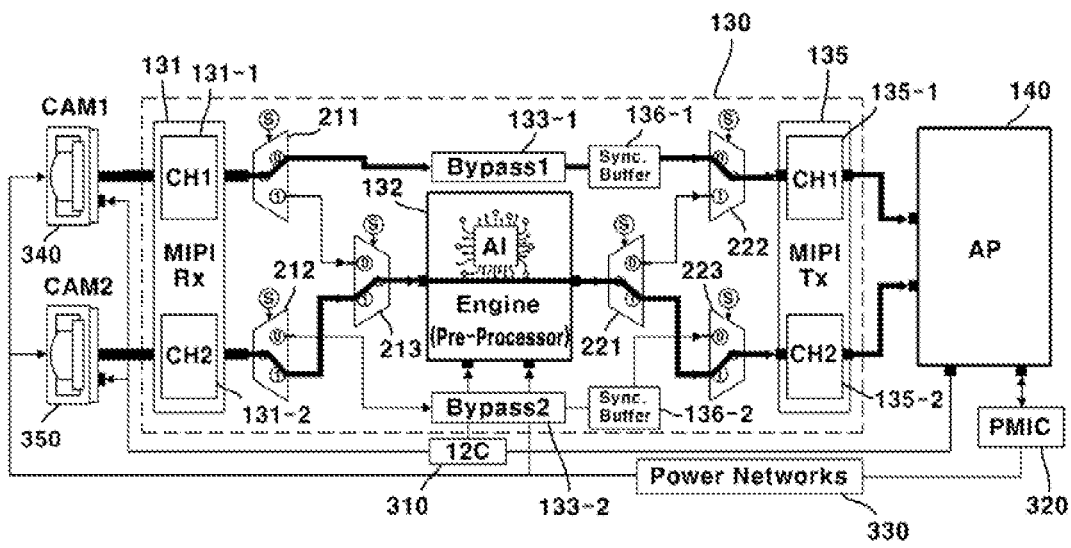

As described above, when a control signal is inputted, each of the first image and the second image inputted from each of the image sensors is transmitted to the bypass path along the bolded path as shown in FIG. 4. Resolution conversion mode (AI-SR Zoom mode) is operated when the AP 140 requests the cameras 340 and 350 for "magnify by X" function, and in this case, the first processor 132 enters into an operation mode to improve image quality. In this case, with the activation of the super resolution (Zoom SR) and low light enhancement (De-noise) functions of the first processor 132, through the first processor 132, the frame (F') output of the preprocessed camera, which is the third image, outputs data improved compared to the original frame (F) that is the first image or the second image. At this time, as for the mode selection, as shown in FIGS. 5 and 6, there may be an activation mode of each of CAM1 and CAM2.

When the resolution conversion mode for the camera 1 (CAM1) 340 is selected, the control signals being applied are as follows.

TABLE 2

| CAM1 | CAM2 | DMW1 | DMW2 | MW1 | DMW3 | MW2 | MW3 |
|------|--------|------|------|-----|------|-----|-----|
| SR | Bypass | 1 | 0 | 0 | 0 | 1 | 0 |

As described above, when a control signal is inputted, as shown in FIG. 5, a first image inputted from the camera 1 340 is transmitted via the first processor 132 along the bolded path via the resolution conversion path, a second image inputted from the camera 2 350 is transmitted along the bolded path via the bypass path. When the resolution conversion mode for the camera 2 (CAM2) 350 is selected, the control signals being applied are as follows.

TABLE 3

| CAM1 | CAM2 | DMW1 | DMW2 | MWI | DMW3 | MW2 | MW3 |
|--------|------|------|------|-----|------|-----|-----|
| Bypass | SR | 0 | 1 | 1 | 1 | 0 | 1 |

As described above, when a control signal is inputted, as shown in FIG. 6, a first image inputted from the camera 1 340 is transmitted via the first processor 132 along the bolded path via the bypass path, a second image inputted from the camera 2 350 is transmitted along the bolded path via the resolution conversion path. When the resolution conversion mode for camera 1 (CAM1) 340 and the camera 2 (CAM2) 350 is selected, the control signals being applied are as follows.

TABLE 4

| CAM1 | CAM2 | DMWI | DMW2 | MW1 | DMW3 | MW2 | MW3 |
|-------|-------|------|------|---------|---------|-----|-----|
| Resv. | Resv. | 1 | 1 | 0 and 1 | 0 and 1 | 1 | 1 |

Figure 7:
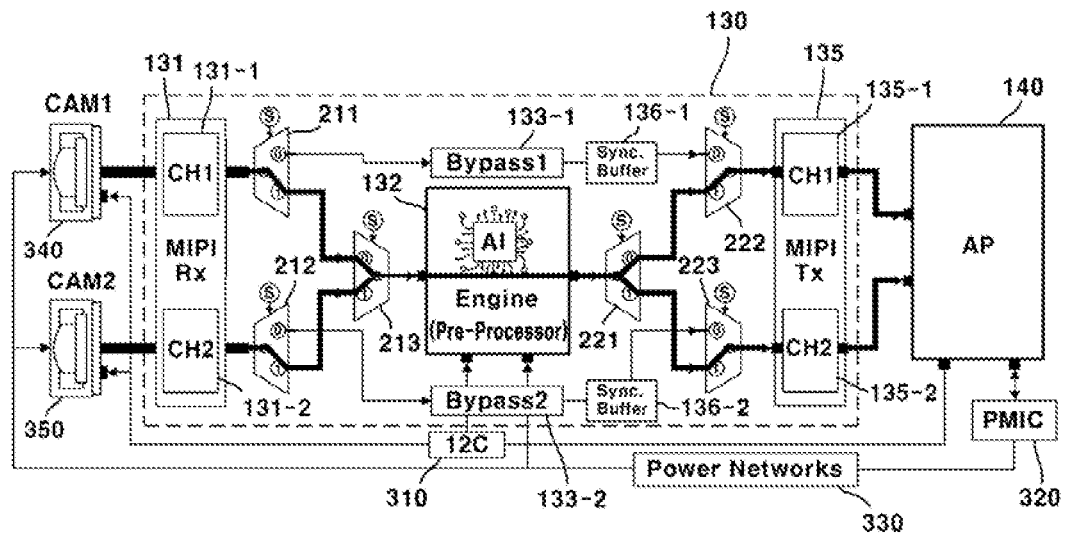

As described above, when a control signal is inputted, as shown in FIG. 7, the first image inputted from the camera 1

340 and the second image inputted from the camera 2 350 are connected to the first processor 132 via the resolution conversion path along the bolded path. The first processor 132 may perform resolution conversion on each of the first image and the second image being received, or may generate a third image for each thereof, respectively. At this time, the first processor 132 may perform resolution conversion on the first image and the second image sequentially or simultaneously through parallel processing. Or, the first processor 132 may output a third image by combining the first image and the second image that have been received. Various types of third images combining images generated by two image sensors or two cameras may be generated. At this time, it may be referred to as a merge mode. As for a sleep mode, the processor enters into a sleep mode when there is no image inputted from both CAM1 and CAM2 cameras, and the same control signal as a bypass mode is applied to wait for the next control signal.

TABLE 5

| CAM1 | CAM2 | DMWI | DMW2 | MW1 | DMW3 | MW2 | MW3 |
|------|------|------|------|-----|------|-----|-----|
| Resv. | Resv. | 0 | 0 | Nop. | Nop. | 0 | 0 |

Figure 8:
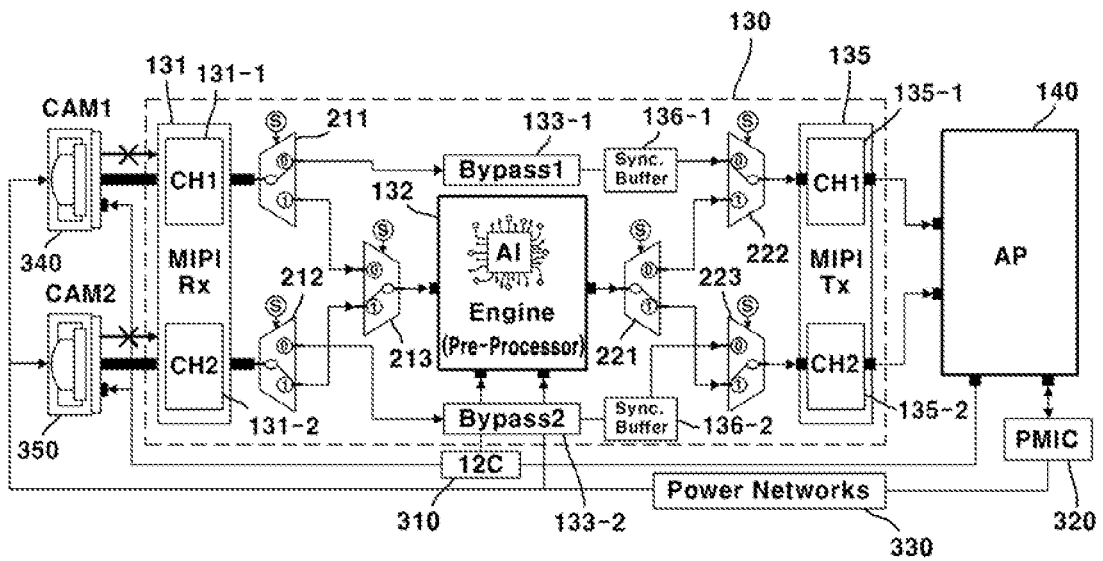

When the control signal is input as described above, the first image or the second image is not inputted from the image sensor, as shown in FIG. 8, no images are transmitted. When at least one image of the first image or the second image having a first resolution is inputted to the first processor 132 according to the resolution conversion control signal, the first processor 132 outputs a third image from at least one of the first image or the second image, as shown in FIG. 9, by using a learned convolutional neural network.

The first processor 132 includes a convolutional neural network (CNN) trained to generate an image with a second resolution from an image with a first resolution, and may store parameters being used to generate image data having a second resolution from image data having a first resolution. Parameters may be stored in a memory. The first processor 132 may be implemented in the form of a chip.

The first processor 132 may perform convolution using parameters according to the type of data being inputted. To this end, parameters corresponding to the types of input data that can be inputted are stored, and when specific data is inputted, convolution can be performed using the corresponding parameters corresponding to the data.

As described previously, the first image or the second image being applied to the first processor 132 may be Bayer data or IR data.

When the data being applied to the first processor 132 is Bayer data, the first processor 132 may generate second Bayer data from the first Bayer data being inputted as the first image or the second image using a learned convolutional neural network. The second Bayer data may be generated from the first Bayer data using other algorithms for increasing the resolution. It is natural that various algorithms being used for super resolution (SR) can be used.

The convolutional neural network (model) used by the first processor 132 is a model that generates image data having a higher resolution than that of the image data inputted, and is learned through training.

The first processor 132 may use a model learned by being applied with a deep neural network (DNN) algorithm. Deep neural networks (DNNs) may be specified as: a deep neural network in which multiple hidden layers exist between an input layer and an output layer; a convolutional neural network that forms a pattern of connections between neurons, similar to the structure of the visual cortex of animals; and a recurrent neural network that builds up a neural network at every moment over time. Specifically, a convolutional neural network reduces the amount of data by repeating convolution and sub-sampling, and classifies neural networks by distortion. That is, a convolutional neural network outputs the classification result through feature extraction and classification, it is mainly used to analyze images, and convolution means image filtering.

The first processor 132 may perform convolution and sub-sampling on an area in which the magnification is to be increased based on data having a first resolution. Sub-sampling refers to the process of reducing the size of an image. At this time, the sub-sampling may use a Max-pooling method or the like. Max-pooling is a technique that selects the maximum value in a given area, and is similar to neurons responding to the loudest signal. Sub-sampling reduces noise, and it has an advantage capable of speeding up learning.

When convolution and subsampling are performed, a plurality of data may be outputted. Here, the plurality of data may be a feature map. Thereafter, a plurality of image data having different characteristics may be outputted using an up-scale method based on the plurality of image data. The up-scaling method means scaling up an image by $r*r$ times by using $r^2$ different filters.

When a plurality of data is outputted according to up-scaling, the first processor 132 may finally output data having a second resolution by recombination based on such image data.

Figure 10:
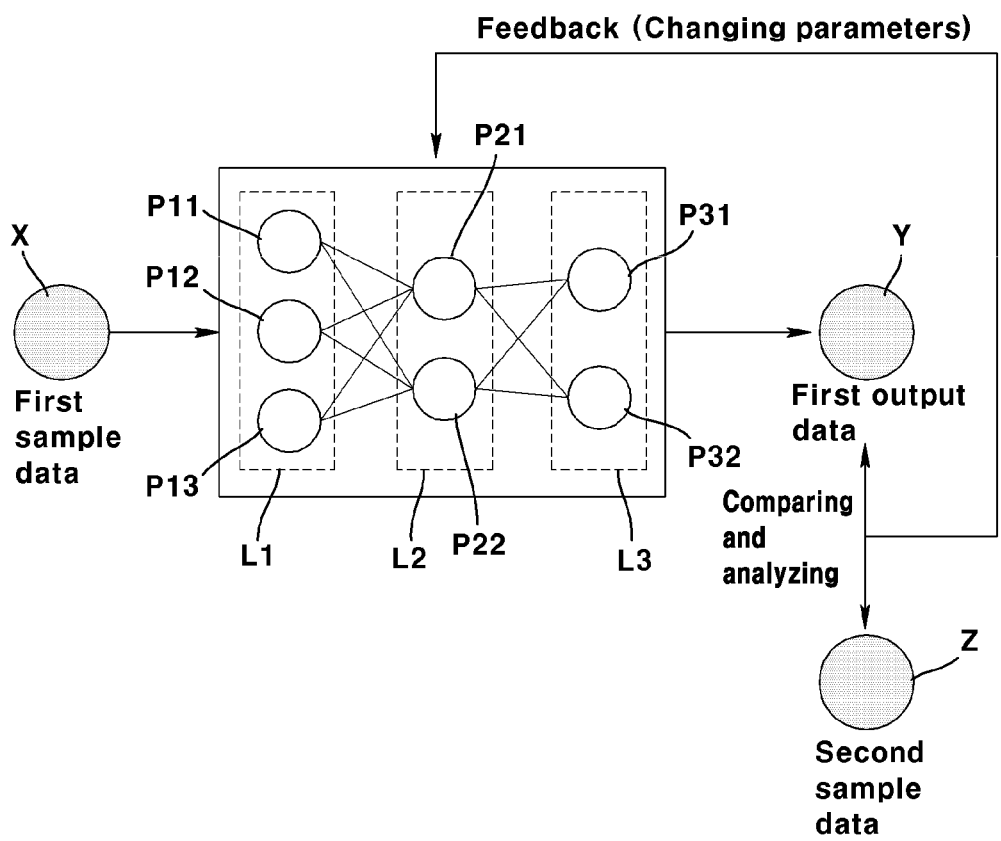

The training process for the convolutional neural network may be performed through repetitive learning as shown in FIG. 10. After receiving the first sample data X and the second sample data Z having different resolutions, based on this, deep learning training may be performed.

Specifically, based on the parameters generated by comparing and analyzing the first output data Y in which deep learning training performed using the first sample data X as input data and the second sample data Z, algorithms to generate Bayer data with higher resolution can be generated.

Here, the first output data Y is data output by actually performing deep learning, and the second sample data Z is data being inputted by the user, and it may mean data that can be output most ideally when the first sample data X is input to the algorithm. Here, the first sample data X may be data in which the resolution is lowered by down-sampling the second sample data Z. At this time, the degree of down-sampling degree may vary depending on the ratio to be enlarged through deep learning, that is, the zoom ratio to which digital zoom is performed. For example, when the zoom ratio to be performed via deep learning is 3× and the resolution of the second sample data Z is 9 MP (mega pixel), since the resolution of the first sampling data X must be 1 MP to become 9 MP which is the resolution of the first output data Y and three times larger in resolution by performing deep learning, a first sample data Y of 1 MP can be generated by down-sampling the second sample data Z of 9 MP by ⅑.

A first output data Y and a second sample data Z being outputted through performing deep learning according to the input of the first sample data X are compared and analyzed to calculate the difference between the two data, and feedback can be given to the parameters of the deep learning model in the direction of reducing the difference between the two data. At this time, the difference between the two data may be calculated through a mean squared error (MSE)

method, which is one of the loss functions. In addition, various loss functions such as cross entropy error (CEE) can be used.

Specifically, after analyzing the parameters affecting the output data, feedback is given by changing or deleting the parameters or creating new parameters so that there may be no difference between the second sample data Z, which is the ideal output data, and the first output data Y, which is the actual output data.

As illustrated in FIG. 10, it may be assumed that there are a total of three layers affecting the algorithm L1, L2, and L3, and there are a total of 8 parameters P11 P12, P13, P21, P22, P31, and P32 respectively in each layer. In this case, if the difference between the first output data Y, which is the actual output data, and the second sample data Z, which is the most ideal output data, is increasing when the parameter is changed in the direction of increasing the value of the P22 parameter, the feedback may change the algorithm in the direction of decreasing the P22 parameter. Conversely, if the difference between the first output data Y, which is the actual output data, and the second sample data Z, which is the most ideal output data, is decreasing when the parameter is changed in the direction of increasing the value of the P33 parameter, the feedback may change the algorithm in the direction of increasing the P33 parameter.

That is, through this method, the algorithm to which deep learning is applied in a way that the first output data Y, which is the actual output data, is outputted similarly to the second sample data Z, which is the most ideal output data. At this time, the resolution of the second sample data Z may be the same as or higher than the resolution of the first output data Y, and the resolution of the second sample data Z may be the same as the resolution of the first output data Y.

In deep learning training, as shown in FIG. 10, when an output result and a comparison target exist, and learning is performed through comparison with the comparison target, training can also be performed using a reward value. In this case, it is possible to first recognize the surrounding environment and transmit the current environment state to a processor that performs deep learning training. The processor performs an action corresponding to it, and the environment informs the processor of the reward value according to the action again. And the processor takes the action that maximizes the reward value. Training can be performed by repeatedly performing learning through this process. In addition, deep learning training can be performed using various deep learning training methods.

Figure 11:
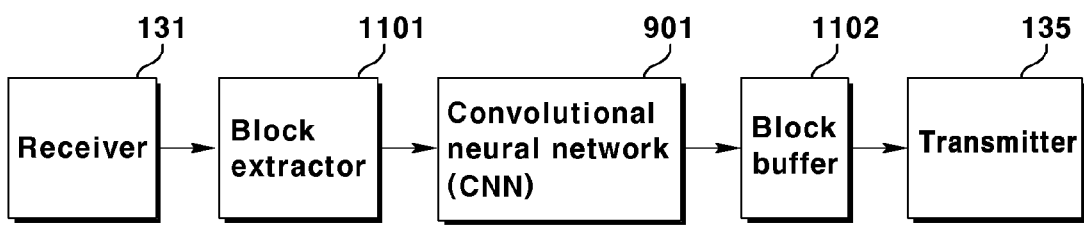

FIG. 11 shows a pipeline processor implemented in an image processing apparatus that performs image processing using the learned convolutional neural network 901, and the pipeline processor may comprise a receiver 131, a block extractor 1101, a convolutional neural network 901, a block buffer 1102, and a transmitter 135. The pipeline processor of FIG. 11 may perform a resolution conversion process using the learned convolutional neural network.

When the receiver 131 receives a first image or a second image, data in various formats may be inputted. For example, it may be inputted in a format having a block size of 1×N, N×N, or N×M.

The block extractor 1101 may extract the format of the received data in 1×N block format for efficient and fast processing. The convolutional neural network 901 trained to output a third image from the noise level and the received data may output a third image data from the data received by receiving the block extracted from the block extractor 1101. The 1×N block image inputted from the convolutional neural network 901 is outputted in high resolution, that is, s×sN blocks in which the size is increased; the s×sN blocks are stored in the block buffer 1102 to generate one third image; and a third image may be outputted at the transmitter 135.

When the first image or the second image being applied to the first processor 132 is IR data, the first processor 132 may generate a second IR data from the first IR data being inputted as a first image or a second image through a learned convolutional neural network. IR data may be inputted from a ToF image sensor.

The ToF image sensor is one of the devices that can acquire depth information, and according to the ToF method, the distance to an object is calculated by measuring the time of flight, that is, the time the light is emitted and reflected. The ToF image sensor generates an output light signal and then irradiates it to the object.

The ToF image sensor may use at least one of a direct method and an indirect method. In the indirect method, an output light signal can be generated and outputted in the form of a pulse wave or a continuous wave. The continuous wave may be in the form of a sinusoid wave or a square wave. By generating an output light signal in the form of a pulse wave or a continuous wave, ToF image sensor may detect the phase difference between the output light signal being outputted and the input light signal being inputted to the ToF image sensor after being reflected from the object.

The direct method is a method of estimating the distance by measuring the time the output light signal sent to the object returns to the receiver, and the indirect method is a method of indirectly measuring the distance using the phase difference when a sine wave sent toward the object returns to the receiver. It utilizes the difference between the peaks (maximum) or valleys (minimum) of two waveforms with the same frequency. The indirect method requires light with a large pulse width to increase the measuring distance, and there are characteristics in that as the measuring distance increases, the precision decreases, and conversely, if the precision is increased, the measurement distance is reduced. The direct method is more advantageous for long distance measurement than the indirect method.

The ToF image sensor generates an electrical signal from an input light signal. The phase difference between the output light and the input light is calculated using the generated electrical signal, and the distance between the object and the ToF image sensor is calculated using the phase difference. Specifically, the phase difference between the output light and the input light can be calculated using the charge amount information of the electric signal. Four electrical signals may be generated for each frequency of the output light signal. Accordingly, the ToF image sensor may calculate the phase difference td between the output light signal and the input light signal using Equation 1 below.

$$t_d = \arctan\left(\frac{Q_3 - Q_4}{Q_1 - Q_2}\right) \qquad \text{[Equation 1]}$$

Here, $Q_1$ to $Q_4$ are the charge amounts of each of the four electrical signals. $Q_1$ is the electric charge amount of the electric signal corresponding to the reference signal of the same phase as the output light signal. $Q_2$ is the electric charge amount of the electric signal corresponding to the reference signal whose phase is 180 degrees slower than the output light signal. $Q_3$ is the electric charge amount of the electric signal corresponding to the reference signal whose phase is 90 degrees slower than the output light signal.

$Q_4$ is the electric charge amount of the electrical signal corresponding to the reference signal whose phase is 270 degrees slower than the output light signal. Then, the distance between the object and the ToF image sensor may be calculated using the phase difference between the output light signal and the input light signal.

At this time, the distance d between the object and the ToF image sensor may be calculated using Equation 2 below.

$$d = \frac{c}{2f} \frac{t_d}{2\pi} \qquad \text{[Equation 2]}$$

Here, c is the speed of light and f is the frequency of the output light.

The ToF image sensor generates IR data using output light and input light.

At this time, the ToF image sensor may generate raw data that is IR data for four phases. Here, the four phases may be 0°, 90°, 180°, and 270°, and the IR data for each phase may be data comprising digitized pixel values for each phase. IR data may be used interchangeably with phase data (image), phase IR data (image), and the like.

The first processor 132 may store an IR data parameter that is a parameter used to generate second IR data having a second resolution from the first IR data having a first resolution in the memory.

The convolutional neural network (model) applied to the IR data is only different in the parameters being used, and corresponds to a convolutional neural networks on Bayer data as described previously. The parameters for IR data can be derived through separate training as previously explained.

As described above, the third image having the second resolution, in which the first processor 132 is outputted, is outputted to the second processor 140 together with another image bypassing the first processor 132 at the transmitter 135. The second processor 140 that has received at least two of the first to third images may generate an image by image processing at least one image of at least two images that has received. When the corresponding image is Bayer data, an RGB image can be generated, and when the corresponding image is IR data, an IR image or a depth image can be generated. In addition, the second processor 140 may generate an RGB image with improved low-light by calculating the RGB image and the IR image.

The second processor 140 may generate a first RGB image through image processing on the Bayer data. The image processing process of the second processor 140 may include more than one among gamma correction, color correction, auto exposure correction, and auto white balance processes. The second processor 140 may be an image signal processor (ISP) and may be formed on the AP. Or, it may be a processing unit configured separately from the ISP.

In addition, the second processor 140 may generate IR data that is an amplitude image or an intensity image by using the IR data.

When the ToF image sensor is an indirect method, if calculated as in Equation 3 using four IR data having four different phases being outputted from the ToF image sensor, an amplitude image, which is a ToF IR image, can be obtained.

$$\text{Amplitude Amplitude} = \qquad \text{[Equation 3]}$$
$$\frac{1}{2}\sqrt{(\text{Raw}(x_{90}) - \text{Raw}(x_{270}))^2 + (\text{Raw}(x_{100}) - \text{Raw}(x_0))^2}$$

Here, Raw $(x_0)$ is a data value for each pixel being received by the ToF image sensor at phase 0°, Raw $(x_{90})$ is a data value for each pixel being received by the sensor at phase 90°, Raw $(x_{180})$ is a data value for each pixel being received by the sensor at phase 180°, and Raw $(x_{270})$ may be a data value for each pixel being received by the sensor at phase 270°.

Or, an intensity image, which is another ToF IR image, may be obtained by calculating as in Equation 4 using four IR data.

$$\text{Intensity} = |\text{Raw}(x_{90}) - \text{Raw}(x_{270})| + |\text{Raw}(x_{180}) - \text{Raw}(x_0)| \qquad \text{[Equation 4]}$$

As described above, the ToF IR image is an image being generated through a process of subtracting two of the four phase IR data from each other, and in this process, external light (background light) can be removed. Accordingly, only the signal in the wavelength band outputted by the light source remains in the ToF IR image, thereby increasing the IR sensitivity of the object and remarkably reducing noise.

The IR image generated by the second processor 140 may mean an amplitude image or an intensity image, and the intensity image may be used interchangeably with a confidence image. The IR image may be a gray image.

On the other hand, if the four-phase IR data is used and calculated as in Equations 5 and 6, a depth image can also be obtained.

$$\text{Phase} = \arctan\left(\frac{\text{Raw}(x_{90}) - \text{Raw}(x_{270})}{\text{Raw}(x_{180}) - \text{Raw}(x_0)}\right) \qquad \text{[Equation 5]}$$

$$\text{Depth} = \frac{1}{2f}c\frac{\text{Phase}}{2\pi} \quad (c = \text{speed of light}) \qquad \text{[Equation 6]}$$

The second processor 140 may generate a second RGB image with improved image quality from the first RGB image by using the IR image that has been generated.

More specifically, the second processor 140 may generate the second RGB image by using: a reflection component of the first RGB image; the result value calculated by calculating the IR image; and a hue component and a chroma component of the first RGB image.

By using the IR image generated as described above, it is possible to improve the quality of the RGB image being photographed and generated in the image sensor in a low-light environment. The second processor 140 generates a first RGB image from an image that is Bayer data. Thereafter, the first RGB image is converted into a first HSV image through color channel conversion. Here, the RGB image means data expressed as a combination of three components: red, green, and blue, and the HSV image may refer to data expressed as a combination of three components: hue, chroma, and brightness. Here, hue and chroma have color information, and brightness may have brightness information. Thereafter, the brightness component (V) among the hue component (H), the chroma component (S), and the brightness component (V) of the first HSV image is separated into a reflection component and an illumination component to extract a reflection component.

Here, the reflection component may include a high-frequency component, and the illumination component may include a low frequency component, and hereinafter, separation of the brightness component (V) into a low-frequency component and a high-frequency component in order to extract the reflection component and then separating the high-frequency component therefrom will be described as an example, but it is not limited thereto. For example, the high-frequency component includes gradient information or edge information of an image, and the illumination component, for example, the low frequency component, may include brightness information of the image.

To this end, by performing low-pass filtering on the brightness component (V) of the first HSV image, the low-frequency component (L) may be obtained. When low-pass filtering is performed on the brightness component (V) of the first HSV image, gradient information or edge information may be lost due to blur. A high-frequency component (R) for the brightness component of the first HSV image is obtained through an operation of removing the low-frequency component (L). To this end, the brightness component (V) and the low frequency component (L) of the first HSV image may be calculated. For example, an operation of subtracting the low frequency component (L) from the brightness component (V) of the first HSV image may be performed.

The second processor 140 generates an IR image from the IR data image. Here, the ToF IR image may be an amplitude image or an intensity image generated from IR data for four phases of 0°, 90°, 180° and 270°.

At this time, the second processor 140 may correct the IR image before performing an operation with the first RGB image. For example, the ToF IR image may have a different size from the first RGB image, and in general, the ToF IR image may be smaller than the first RGB image. Accordingly, by performing interpolation on the ToF IR image, the size of the ToF IR image may be enlarged to the size of the first RGB image. Since the image may be distorted during the interpolation process, the brightness of the ToF IR image may be corrected. Then, at the same time as obtaining the illumination component for the brightness component of the first HSV image, the brightness component (V') of the second HSV image is obtained using a reflection component for the brightness component of the first HSV image, for example, a high-frequency component and a ToF IR image. Specifically, a reflection component of the brightness component of the first HSV image, for example, a high frequency component and a ToF IR image may be matched. Here, an operation for obtaining an image with improved brightness by combining the illumination component and the reflection component modeled using the ToF IR image may be used, and this may be an operation opposite to the operation used to remove the low-frequency component (L) from the brightness component of the first HSV image. For example, an operation in which a reflection component of the brightness component of the first HSV image, for example, a high frequency component, and the ToF IR image is added may be performed. As such, after removing the illumination component for the brightness component of the first HSV image, for example, the low frequency component, when calculating the reflection component, for example, the high frequency component, and the ToF IR image for the brightness component of the first HSV image, the brightness of an RGB image photographed in a low-light environment may be improved.

Thereafter, a second RGB image is generated through color channel conversion by using: a brightness component (V') obtained through calculation, a hue component (H) obtained through color channel transformation, and a chroma component (S). A hue component (H) and a chroma component (S) in the HSV image may have color information, and the brightness component (V) may have brightness information. If the calculated value (V'), in which only the reflection component of the brightness component (V) is combined with the ToF IR image, and the hue component (H) and chroma component (S) are used as previously obtained, only brightness in low-light environment can be improved without color distortion. The input image may consist of a product of a reflection component and an illumination component, the reflection component may consist of a high frequency component, the illumination component may consist of a low frequency component, and the brightness of the image may be affected by the illumination component. However, if the illumination component, that is, the low-frequency component, is removed from the RGB image taken in a low-light environment, the brightness value of the RGB image may become excessively high. In order to compensate for this, the ToF IR image is matched to the brightness component of the RGB image from which the illumination component, that is, the low frequency component, has been removed, and as a result an RGB image with improved image quality in low-light environment can be obtained.

As described previously, the IR image generated in the second processor 140 may be an amplitude image or an intensity image being generated from second IR data according to four different phases, and in the case of an indirect ToF image sensor using IR data according to four different phases, in order to generate one IR image, the time of one cycle of the ToF image sensor is required, but the time to generate the first IR data in the ToF image sensor may be longer than the time the image sensor generates a first data. Accordingly, a time delay may occur in generating an RGB image with improved image quality.

In order to avoid this time delay, the frame rate per hour (fps) of the ToF image sensor may be faster than the frame rate per hour of RGB image sensor. In order for the ToF image sensor to generate one IR image, it must generate IR data according to four different phases, and to this end, by controlling the frame rate per hour of the ToF image sensor that photographs sub-frames, which is IR data according to each phase, to be faster than the frame rate per hour of the RGB image sensor so that the time delay can be avoided. The frame rate per hour of the ToF image sensor may be set according to the frame rate per hour of the RGB image sensor. The speed at which the ToF image sensor photographs sub-frames of IR data according to one phase may be faster than the speed at which the RGB image sensor photographs to produce one Bayer data. In addition, the frame rate per hour may vary depending on the working environment, zoom magnification, or specifications of the ToF image sensor or RGB image sensor. Therefore, considering the time for generating one IR data according to four different phases by the ToF image sensor and the time taken for photographing to generate one Bayer data by the RGB image sensor, the frame rate per hour of the ToF image sensor can be set differently. The frame rate per hour may be a shutter speed of each sensor.

In addition, the second processor 140 may generate not only the second RGB image, but also a 3D color image comprising both color information and depth information by registering and rendering the IR image and depth image generated from the IR data of the ToF image sensor to the RGB image.

Figure 12:
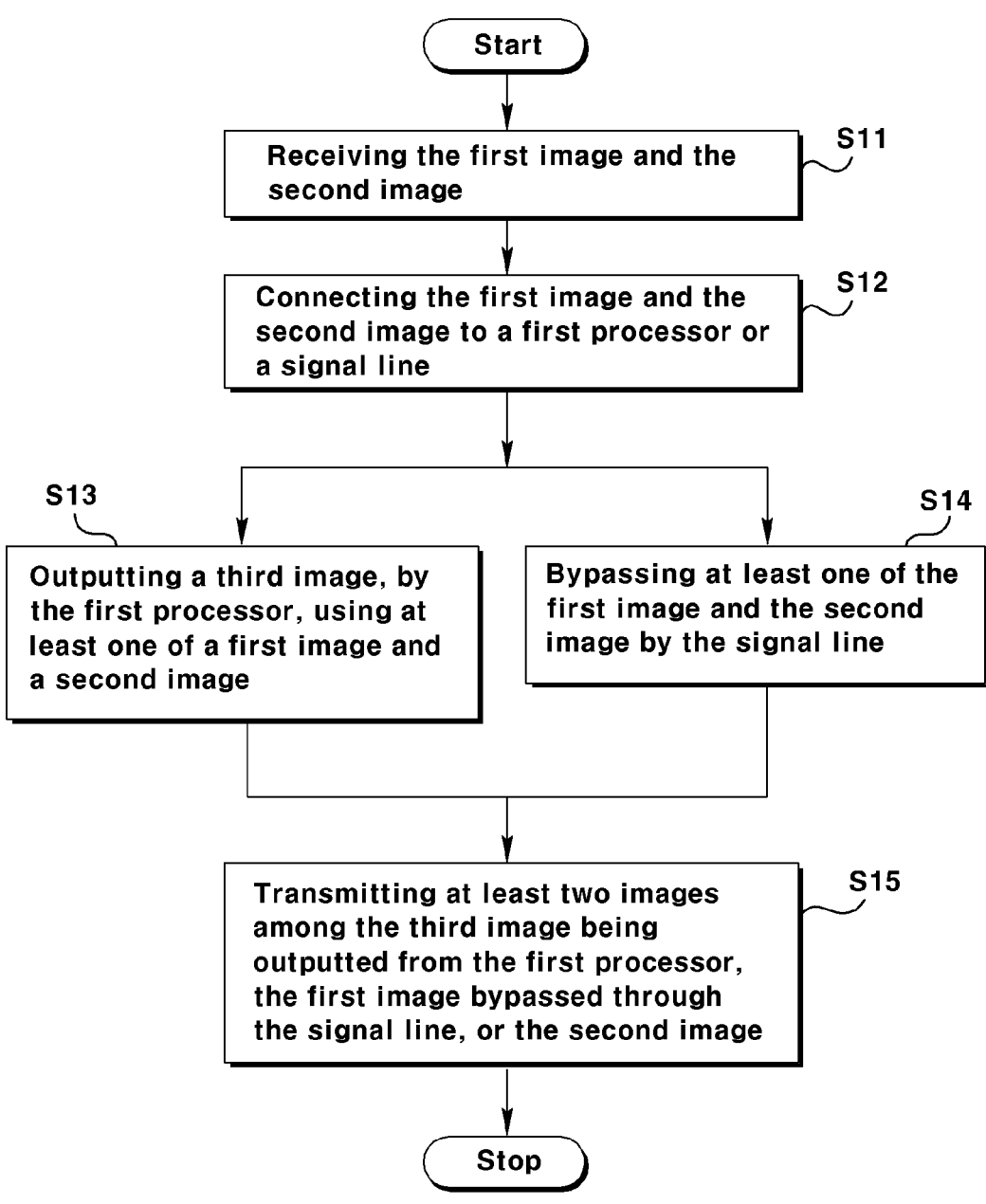
FIG. 12 is a flowchart of an image processing method according to an embodiment of the present invention.
Figure 13:
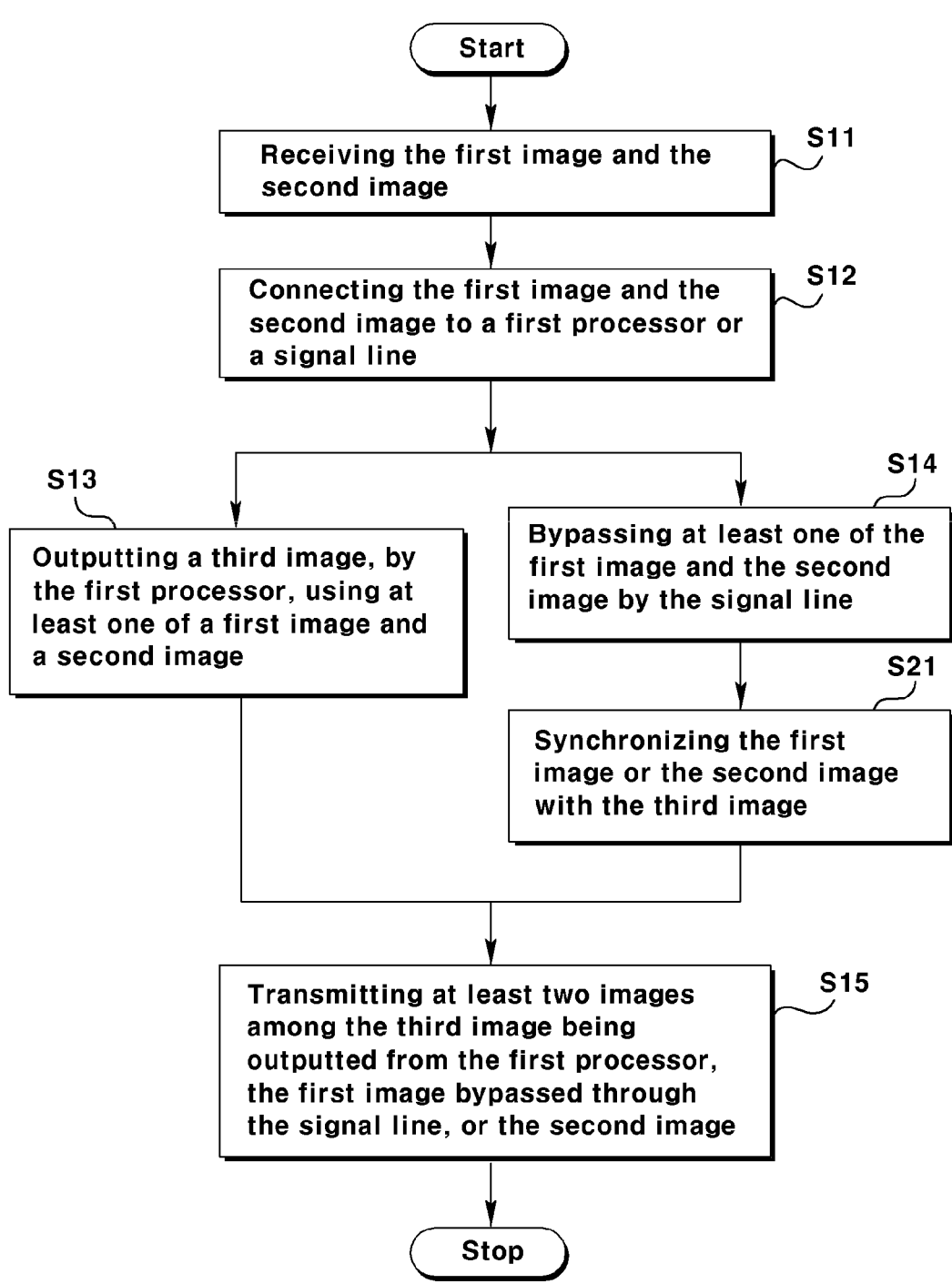
FIG. 13 is a flowchart of an image processing method according to another embodiment of the present invention.

FIG. 12 is a flowchart of an image processing method according to an embodiment of the present invention; and FIG. 13 is a flowchart of an image processing method according to another embodiment of the present invention. A detailed description of each step of FIGS. 12 to 13 corresponds to a detailed description of the image processing apparatus 130 of FIGS. 1 to 11, and thus, overlapping descriptions will be omitted.

In order to process an image using one processor for a plurality of images, first, in step S11, the first image and the second image are received, and in step S12, the first image and the second image are connected to a first processor or a signal line. At this time, a third image is generated using at least one of the first image and the second image, or a third image may not be generated; according to the control signal controlling this, the first image is connected to the signal line or the first processor by using the first switch; and the second image can be connected to the signal line or the first processor by using the second switch according to the control signal. To generate a third image using one of the first image and the second image, one of the first image and the second image is connected to the first processor and the other one is connected to the signal line, or to generate a third image using both the first image and the second image, the first image and the second image may be connected to the first processor. Or if the third image is not generated from the first image and the second image, the first image and the second image may be connected to the signal line.

The signal line may include a first signal line and a second signal line; when the first image or the second image is connected to the signal line, the first image is connected to the first signal line, and the second image may be connected to the second signal line.

When at least one of the first image and the second image is connected to the first processor, in step S13, the first processor outputs a third image by using at least one of a first image and a second image. The first processor comprises a convolutional neural network, and a third image may be outputted by using a learned convolutional neural network and by using at least one of the first image and the second image.

In step S13, the third image is outputted using at least one of the first image and the second image, and at the same time, in step S14, the signal line bypasses at least one of the first image and the second image. The first image or the second image connected to the signal line may be synchronized with the third image in step S21.

Then, in step S15, at least two images among the third image being outputted from the first processor, the first image bypassed through the signal line, or the second image are transmitted. At this time they may be transmitted to the second processor.

Meanwhile, the embodiments of the present invention can be implemented as computer readable codes on a computer readable recording medium. The computer readable recording medium includes all types of recording devices in which data readable by a computer system is stored.

As for examples of computer readable recording media, there are ROM, RAM, CD-ROM, magnetic tape, floppy disk, and optical data storage device; in addition, the computer readable recording medium is distributed over networked computer systems; and computer readable code can be stored and executed in a distributed manner. In addition, functional programs, codes, and code segments for implementing the present invention can be easily inferred by programmers in the technical field to which the present invention belongs.

As described above, in the present invention, specific matters such as specific components, and the like; and limited embodiments and drawings have been described, but these are only provided to help a more general understanding of the present invention, and the present invention is not limited to the above embodiments, and various modifications and variations are possible from these descriptions by those of ordinary skill in the art to which the present invention belongs.

Therefore, the spirit of the present invention should not be limited to the described embodiments, and not only the claims to be described later, but also all those with equivalent or equivalent modifications to the claims will be said to belong to the scope of the spirit of the present invention.

The invention claimed is:

1. An image processing apparatus comprising:
a receiver configured to receive a first image and a second image, the second image different from the first image;
a first processor configured to output a third image by using one of the first image and the second image, the third image different from the first image and the second image;
a first signal line bypassing the first processor;
a second signal line bypassing the first processor, the second signal line different from the first signal line;
a first switch connecting the first image to the first signal line or the first processor according to a control signal;
a second switch connecting the second image to the second signal line or the first processor according to the control signal; and
a transmitter configured to transmit at least two images among the first to third images.

2. The image processing apparatus according to claim 1, wherein the first processor comprises a convolutional neural network.

3. The image processing apparatus according to claim 1, wherein the first switch connects one of the first image to the first processor, and connects the second image to the second signal line.

4. The image processing apparatus according to claim 1, wherein the first switch connects the first image to the first signal line, and
wherein the second switch connects the second image to the second signal line.

5. The image processing apparatus according to claim 1, wherein the first image is connected to the first signal line by first the switch, and
wherein the second image is connected to the second signal line by the second switch.

6. The image processing apparatus according to claim 5, wherein the first signal line comprises a first synchronizing unit, and
wherein the second signal line comprises a second synchronizing unit.

7. The image processing apparatus according to claim 1, wherein the transmitter transmits the at least two images to a second processor.

8. The image processing apparatus according to claim 7, wherein the second processor comprises an ISP (Image Signal Processor).

9. The image processing apparatus according to claim 1, wherein the first processor performs super resolution (SR) generating the third image having a second resolution from at least one image of the first image and the second image having a first resolution.

10. An image processing method comprising:
receiving a first image and a second image, the second image being different from the first image;

sending a third image outputted from a first processor and one of the first image and the second image through a respective signal line, when one of the first image and the second image bypasses the first processor and the other one of the first image and the second image is connected to the first processor, wherein the third image is different from the first image and the second image, wherein the respective signal line for the first image is a first signal line that bypasses the first processor and the respective signal line for the second image is a second signal line that bypasses the first processor, wherein the second signal line is different from the first signal line, and wherein the connecting one of the first image and the second image to the first processor and the other bypassing the first processor through the respective signal line comprises:

connecting the first image to the first signal line or the first processor using a first switch according to a control signal, and connecting the second image to the second signal line or the first processor using a second switch according to the control signal.

11. The image processing method according to claim 10, wherein the first processor comprises a convolutional neural network.

12. The image processing method according to claim 10, wherein the connecting the first image and the second image to the first processor or respective signal line comprises:

connecting one of the first image and the second image to the first processor, and connecting the other image to a respective signal line.

13. The image processing method according to claim 10, wherein when the first image is connected to the first signal line, and wherein when the second image is connected to the second signal line.

14. The image processing method according to claim 10, further comprising:

synchronizing the first image or the second image connected to a respective the signal line with the third image.

15. The image processing method according to claim 14, wherein the synchronizing comprises:

synchronizing the first image with the third image using a first synchronizing unit, or synchronizing the second image with the third image using a second synchronizing unit.

16. The image processing method according to claim 10, wherein the first processor performs super resolution (SR) generating the third image having a second resolution from at least one image of the first image and the second image having a first resolution.

17. The image processing apparatus of claim 1, wherein the transmitter is configured to transmit a first transmission channel and a second transmission channel, the first transmission channel is configured to transmit the first image or the third image, and the second transmission channel is configured to transmit the second image or the third image.

18. The image processing apparatus of claim 1, wherein the control signal includes:

a first state causing the first switch to provide the first image to the first signal line and the second switch to provide the second image to the second signal line;

a second state causing the first switch to provide the first image to the first signal line and the second switch to provide the second image to the first processor; and a third state causing the first switch to provide the first image to the first processor and the second switch to provide the second image to the second signal line.

* * * * *